United States Patent
Dunbar et al.

(10) Patent No.: US 7,731,855 B2
(45) Date of Patent: Jun. 8, 2010

(54) SEPTIC TANKS

(75) Inventors: Neil James Dunbar, Traralgon (AU); Matt Goodall Parsons, Bonnie Doon (AU)

(73) Assignee: Samaran International Pty Ltd, Traralgon (AU)

( * ) Notice: Subject to any disclaimer, the term of this patent is extended or adjusted under 35 U.S.C. 154(b) by 0 days.

(21) Appl. No.: 12/162,856

(22) PCT Filed: Feb. 6, 2007

(86) PCT No.: PCT/AU2007/000111
§ 371 (c)(1),
(2), (4) Date: Jul. 31, 2008

(87) PCT Pub. No.: WO2007/092986
PCT Pub. Date: Aug. 23, 2007

(65) Prior Publication Data
US 2009/0008338 A1    Jan. 8, 2009

(30) Foreign Application Priority Data
Feb. 15, 2006    (AU) .............................. 2006900726

(51) Int. Cl.
*C02F 1/00* (2006.01)
(52) U.S. Cl. ...................... 210/741; 210/747
(58) Field of Classification Search .............. 210/86, 210/104, 170.08, 532.1, 532.2, 741, 744, 210/747, 800, 801; 73/290 R, 64.55; 116/109, 116/227; 137/558; 702/50, 55, 138, 188
See application file for complete search history.

(56) References Cited

U.S. PATENT DOCUMENTS

| | | | |
|---|---|---|---|
| 3,866,935 A | | 2/1975 | Nelson |
| 4,348,278 A | * | 9/1982 | Caccia ........................ 210/86 |
| 4,669,309 A | * | 6/1987 | Cornelius ..................... 73/299 |
| 4,715,966 A | * | 12/1987 | Bowman ..................... 210/800 |
| 5,601,393 A | | 2/1997 | Waldschmitt |
| 5,946,967 A | * | 9/1999 | Russell ..................... 73/290 R |
| 6,012,020 A | * | 1/2000 | Gardell et al. ................ 702/50 |
| 6,217,752 B1 | * | 4/2001 | Coots .......................... 210/86 |
| 6,274,033 B1 | * | 8/2001 | Hudgin ........................ 210/86 |
| 6,619,118 B1 | * | 9/2003 | Keck ........................ 73/304 C |
| 6,863,805 B1 | * | 3/2005 | Barreras et al. ............. 210/143 |
| 6,879,935 B2 | * | 4/2005 | Keck .......................... 702/168 |
| 6,928,862 B1 | * | 8/2005 | Robbins .................... 73/64.55 |
| 2004/0093942 A1 | * | 5/2004 | Brun .......................... 73/301 |
| 2006/0226071 A1 | * | 10/2006 | Allen et al. ................. 210/620 |

FOREIGN PATENT DOCUMENTS

| | | |
|---|---|---|
| DE | 2360425 A | 6/1975 |
| DE | 10262031 B4 | 5/2004 |
| JP | 2003305309 A | 10/2003 |

* cited by examiner

*Primary Examiner*—Duane Smith
*Assistant Examiner*—Paul J Durand
(74) *Attorney, Agent, or Firm*—Volpe and Koenig, P.C.

(57) ABSTRACT

A method of determining whether a septic tank containing a liquid and sludge or scum mixture needs to be emptied, comprising locating a sensor in the mixture wherein the sensor is adapted to measure a parameter which can be used to determining the depth of sludge or scum in the septic tank and generating a warning signal when a signal from the sensor is indicative of a depth of sludge or scum exceeding a predetermined limit.

5 Claims, 2 Drawing Sheets

SEPTIC TANKS

FIELD OF THE INVENTION

This invention relates to methods for sensing when septic tanks need to be inspected prior to making a decision on whether they need to be emptied and to sensors and sensing systems for detecting excessive sludge or scum levels in septic tanks.

BACKGROUND OF THE INVENTION

Septic tanks operate by allowing sewage to be digested in the tank for an appropriate residence time before fluid which has been subject to digestion in the tank overflows from the tank into a distribution system in surrounding soil. After a period of time, there is an inevitable build-up of sludge at the bottom of the septic tank. As the level of sludge in the septic tank rises, the residence time of sewerage entering the tank for digestion begins to decrease. When the sludge level becomes high, the residence time of sewerage may be so short that there is insufficient time for adequate digestion. As a result, inadequately digested sewerage from the overflow outlet of the tank which may even contain suspended matter is fed to the surrounding liquid distribution system. The dirty effluent can cause the distribution lines to clog with the result that the surrounding area may become contaminated with dangerous biological material. This biological material can even seep into nearby creeks and rivers making them unsafe for recreational or drinking purposes.

Scum, a lightweight layer typically including a substantial oil component may also build up as a surface layer with time. Excess scum may also hinder digestion and lead to premature overflow of inadequately digested material.

In order to reduce the likelihood of contamination of surrounding areas and water courses by septic tanks, there is a mandatory legal requirement in the State of Victoria, Australia that septic tanks be emptied at least once every three years to remove sludge and/or scum. However, in practice despite this mandatory legal requirement, most septic tanks are not emptied for far longer periods.

In most instances, sludge or scum build-up in a typical septic tank will not be unacceptable in the relatively short time span of three years. However, because of the variable nature of usage of different septic tanks and the fact that there is no adequate monitoring system, the relatively short mandatory three year time span for emptying septic tanks is necessary to cover the unusual situation where some septic tanks require emptying within such a short period. The risks of not following such a regime, such as threats to health and the expense of redoing the distribution lines when they are clogged, are otherwise too great.

Thus there is a need for a method of monitoring when a septic tank needs to be inspected for excess scum or sludge so as to avoid the need for mandatory emptying every three years or such other time as is set by legislation.

DISCLOSURE OF THE INVENTION

The invention provides a method of determining whether a septic tank containing a water and sludge or scum mixture needs to be emptied, comprising locating a sensor in the mixture wherein the sensor is adapted to measure a parameter which can be used to determine the depth of sludge or scum in the septic tank and generating a warning signal when a signal from the sensor is indicative of a depth of sludge or scum exceeding a predetermined limit.

Typically, the septic tank may be divided into a primary chamber which receives raw sewerage and a secondary chamber from which digested fluid exits into a distribution system. In such an arrangement, the primary and secondary chambers may be separated by a wall or baffle with an opening allowing fluid communication between the two chambers. Thus, the arrangement may be such that sludge accumulates in the primary chamber below the level of the opening. The scum may accumulate as a top layer.

In such an arrangement, the density of sludge at least in the early stages of deposition of the sludge on the floor of the primary chamber, tends to be greater than water. Applicants therefore propose that one parameter which may be characteristic of the level of sludge in the primary chamber of the septic tank may be related to the density of the sludge/water mixture in the primary chamber. This may be reflected by the pressure which is found at various levels in the tank and it is particularly true of pressure at the bottom of the tank in the primary chamber. Typically, the density of sludge will range between 1.01 to 1.1, more typically 1.03 to 1.07. This compares with a normal density for water of about 1.

Thus applicant's propose that a pressure sensor may be used as a means of giving an indication of the level of sludge in the septic tank. The pressure sensor may be located at or near the base of the primary chamber. However it also may be located at higher levels. There may be more than one pressure sensor. There may be a plurality of pressure sensors arranged at different levels in the primary chamber.

The pressure sensor may be associated with a monitoring system. Thus the pressure sensor may send a signal to the monitoring system indicating the pressure proximate the bottom of the tank. By taking into account the density of sludge, a rough calculation of the level of sludge in the septic tank may be made. The monitoring system may be set so as to give an indication as to whether the general level and hence depth of sludge is approaching the level of the opening in the baffle between the primary and secondary chambers. Once the sludge reaches the level of the opening, it may spill into the secondary chamber. This is undesirable from the point of view of residence time and the amount of digestion achieved. Thus, the monitoring system may be set so as to generate a signal which indicates the septic tank needs to be inspected and subject to the results of inspection, emptied prior to the level of the sludge being at or near the level of the opening in the baffle. The signal can take any form as is known in the art, eg. a warning light, a displayed message, an alarm or even an electronic signal relayed to a central control associated with a sludge removal company.

Where the monitoring system is based upon pressure readings taken near the bottom of the tank, it is anticipated that a pressure variation compared with water of about 1% or higher, more preferably about 2% or higher may be sufficient to trigger an indication that the septic tank needs to be emptied. In other words, the average density of mixture in the primary chamber may rise to at least 1.01 more preferably about 1.02 or more before the signal is activated.

The monitoring system may include timing means to automatically ensure that regular readings are taken. Alternatively, it may monitor the pressure on a continuous basis.

In some instances, where sludge has been allowed to build up for too long, it is anticipated that after initially increasing in density, the reading for sludge density may actually decrease. Thus, as an alternative to the above scenario, the reading decrease in sludge density after the initial increase, may be taken as an indicator that the septic tank needs to be emptied ie. if pressure decreases by more than 1% at the bottom for a given level of liquid mixture this may be taken as an indication that inspection is required.

In another scenario, pressure may decrease if the septic tank springs a leak. The resultant low pressure reading would generate a warning signal to indicate the tank needs to be checked.

Whilst it is anticipated that pressure sensing will be one preferred method of carrying out the invention, it is to be appreciated that other methods of sensing parameters characteristic of the level of the sludge may be used. For example, a transducer which vibrates within the sludge may be used to give an indication of sludge depth. The transducer may be located at a level at or below the opening in the baffle so that when the sludge reaches the level of the transducer the changing characteristics of vibration of the transducer resulting from varying damping properties or viscosity may be used as an indication of the level of the sludge.

Another alternative may involve the use of a conductimetric approach such as a pair of conductive plates arranged at an appropriate level, to determine the presence of sludge.

Yet another method may involve measurement of light transmission or other electromagnetic wave at an appropriate level to determine whether sludge has reached a predetermined level at which the tank needs to be emptied. Combinations of two or more of these possibilities may also be used as required.

Another parameter which may give an indication that the tank needs to be inspected and possibly emptied may be determined through measuring the scum layer which normally builds up on top of the liquid in the septic tank. The scum layer is an oily scummy layer which floats on top and generally has a density less than 1. As the scum layer builds up on top, so does the sludge layer at the bottom of the tank. Hence the thickness of the scum layer can be used as a guide to the sludge layer build up. Thus a measure of thickness of the scum layer may be used as the parameter to trigger emptying of the tank.

Additionally, in some instances, especially where sewerage has a high oil component, the scum layer may rapidly build up to a level which is unacceptable even when the sludge layer is still of acceptable thickness. Thus, measuring the thickness of the scum layer may be an appropriate monitoring technique even if the sludge layer has not built up unduly ie. the presence of excess scum is itself a reason for emptying the tank as this too can make its way into the distribution lines and clog them (making it difficult for the effluent to be dispersed).

At the start of the tank use, the density will be that of water as this covers the "shallow" scum sensor. As the scum layer (low density oil/fat) builds up the apparent density may fall. However, in a parallel to the lower sludge sensor, it is likely that in some instances the encapsulation of the sensor in the scum will cause the apparent density to fall to a level much lower than would be anticipated by simply calculating the pressure difference between the density of water and the density of oil/fat. This may be akin to encapsulating the sensor in a jelly which sets over time. The scum may also adhere to the sides of the tank both mechanisms acting to mask the pressure.

In practice applicants have actually measured as much as a 20% decrease in the apparent density of the sludge and scum layers in relation to the density calculated from being in plain water.

The sensing techniques already described with reference to sludge may be equally applicable when applied at the scum layer.

The scum layer thickness may be measured by a sensor placed at or below the level of the scum layer. Initially the sensor may be below the original water level but as the scum builds up it has some thickness and then the sensor may find itself in the scum layer.

It may be a pressure sensor located so that it measures pressure corresponding to an increased thickness of scum at the top of the liquid. Again a pressure variation of 1% in the scum layer region may be sufficient to trigger an inspection.

In a specific aspect of the invention the septic tank may be monitored by placing a sensor near the sludge layer at the bottom of the tank and also in the vicinity of the scum layer to monitor both. If each sensor is a pressure sensor, a variation in sensed pressure for either layer of 1% or more may be used to signal that an inspection of the tank is required.

In another aspect the invention provides a septic tank comprising,
 a container,
 an inlet for directing sewage into the container,
 an outlet for digested sewage from the container,
 a sensor for detecting levels of sludge or scum in the container, and
 alert means for generating a warning signal when the level of sludge or scum as detected by the sensor exceeds a predetermined limit.

In a particular aspect, the container is divided by a baffle into a primary chamber and a secondary chamber,
 the inlet is arranged to direct sewage into the primary chamber,
 there is an opening in the baffle for allowing flow of liquid from the primary chamber to the secondary chamber,
 the outlet is arranged to direct digested sewage from the secondary chamber, and
 the sensor is arranged for detecting levels of sludge or scum in the primary chamber.

Alternatively or additionally, a sensor may be located in the secondary chamber as this would come into play as the primary chamber becomes too full with undigested material flowing from the primary chamber to the secondary chamber.

The pressure sensor may be positioned facing upwards to read the weight of sediment "sitting" on the sensor.

Preferred aspects of the invention will now be described with reference to the accompanying drawings.

DETAILED DESCRIPTION OF THE PREFERRED EMBODIMENTS

Figure 2:
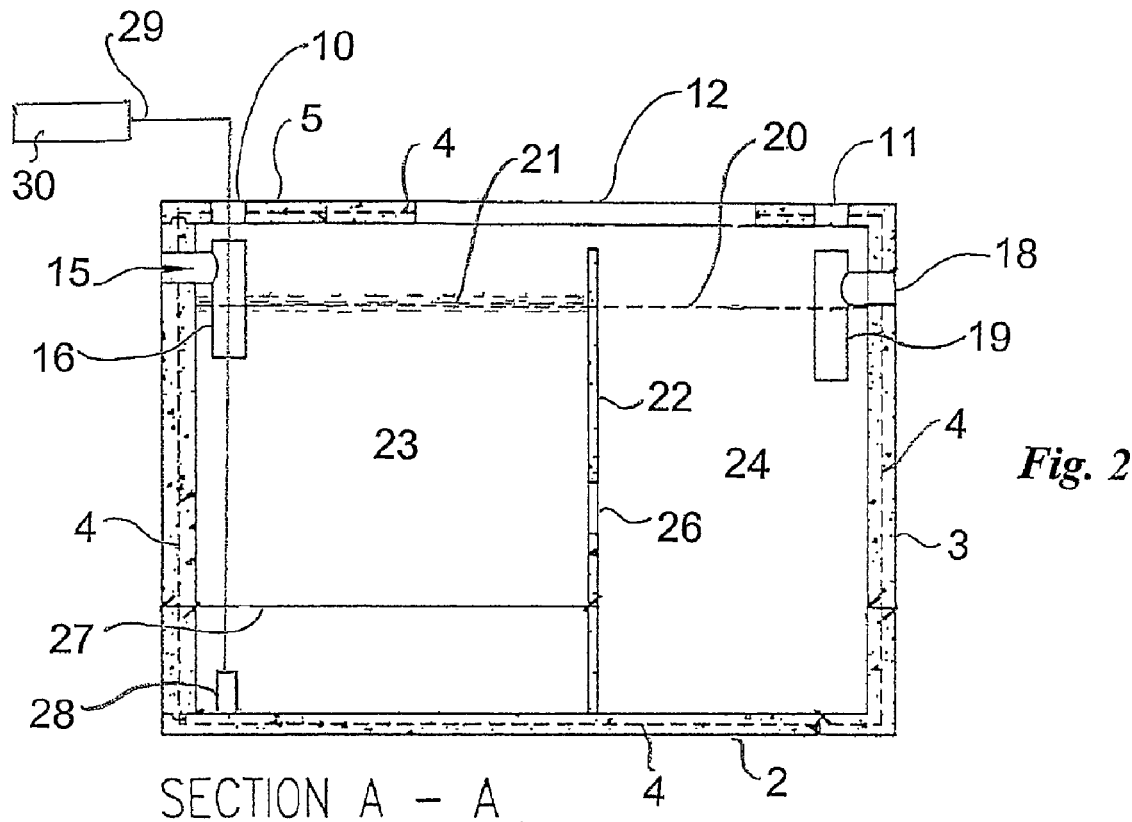
FIG. 2 shows the section A-A taken through the septic tank of FIG. 1.

The various elements identified by numerals in the drawings are listed in the following integer list.

INTEGER LIST

Figure 1:
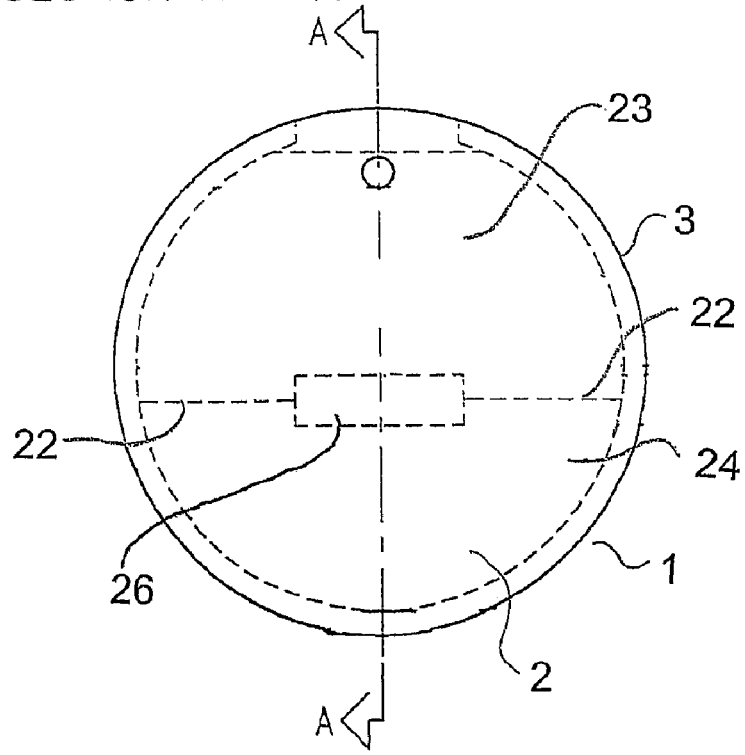
FIG. 1 shows a plan view of the base of a septic tank which may be used for carrying out the method of the invention.

1 Septic tank
2 Circular base
3 Side wall
4 Reinforcement
5 Lid
10 Inspection opening
11 Inspection opening
12 Central opening 15 Inlet
16 T-piece
18 Outlet
19 T-piece
20 Liquid level
21 Scum layer
22 Dividing wall
23 Primary chamber
24 Secondary chamber
26 Opening
27 Sludge level
28 Pressure sensor
29 Cabling
30 Monitor system Referring to FIGS. 1 and 2 of the drawings there is shown a septic tank generally designated by the reference numeral 1 which may typically be a reinforced concrete construction.

The septic tank includes a circular base 2 and a cylindrical side wall 3. A lid 5 covers the top of the tank. Reinforcement 4 is provided in the base, side wall and lid of the tank. Typically this may comprise steel mesh and/or any other reinforcing material which is used for reinforcing concrete.

Inspection openings 10 and 11 are provided on opposite sides of the lid immediately above the T-pieces 16 and 19. A large central opening 12 for providing access to the contents of the septic tank when it needs to be emptied is also provided in the lid. This is normally closed by a cover which neatly fits within and closes off the central opening 12.

The side wall is provided with an inlet 15 for sewerage which directs incoming sewerage into the T-piece and hence into the primary chamber 23 of the septic tank. Both the top and bottom end of the T-piece are open.

An outlet 18 connected to the T-piece 19 takes overflow liquid from the secondary chamber 24 whenever the liquid level 20 exceeds the level of the outlet 18. The outlet is at a lower level than the inlet. From the outlet, the digested liquid from the septic tank is directed to an in ground distribution system as is known in the art.

It is to be noted that there will typically be a scum layer 21 build up at or above level 20. It may extend higher than the level of the outlet 18 in the region of the primary chamber.

The primary and secondary chamber are divided by the dividing wall 22 which has an opening 26 therein at a level below the liquid level 20. The dividing wall in effect acts as a baffle between the primary and secondary chambers.

During typical operation of the septic tank, sludge builds up in the primary chamber to a sludge level which is indicated by the line 27. Over time the sludge, which is of greater density than water builds up from the floor of the tank 4 until it begins to approach the level of the opening 26. However, it is important to ensure that the sludge level does not go so high as to allow the sludge to overflow into the secondary chamber 24 as this will mean the residence time of sewerage in the septic tank has been reduced and there is a risk that inadequately digested fluid will pass through into the secondary chamber and out of the outlet.

As the sludge initially has a higher density than the water, an indication of the level of sludge in the primary chamber can be obtained by locating a pressure sensor 28 near the base of the septic tank. The pressure sensor is connected by cabling 29 to a monitor system 30.

The monitor system may include electronics to take account of the electric pressure signal provided by the pressure sensor 28 either continuously or on a periodic basis. When the pressure rises above a predetermined limit as may be set on the monitor system, the monitor system may generate a warning or other indication that the septic tank needs to be inspected and possibly emptied. For example, if the pressure of fluid including sludge in the primary chamber increases by as much as 1% or 2% above the pressure which would be expected with pure water, the monitoring system may generate an appropriate signal to indicate that the tank needs to be inspected. In order to do so, the monitor system may include a reference point setting for adjusting the pressure sensitivity of the monitoring system for different sizes of tanks ie. a deeper tank will have a higher reference point pressure than a shallower one. Thus for each tank, an individual pressure based upon a primary chamber filled with pure water may be set as a reference point.

Figure 3:
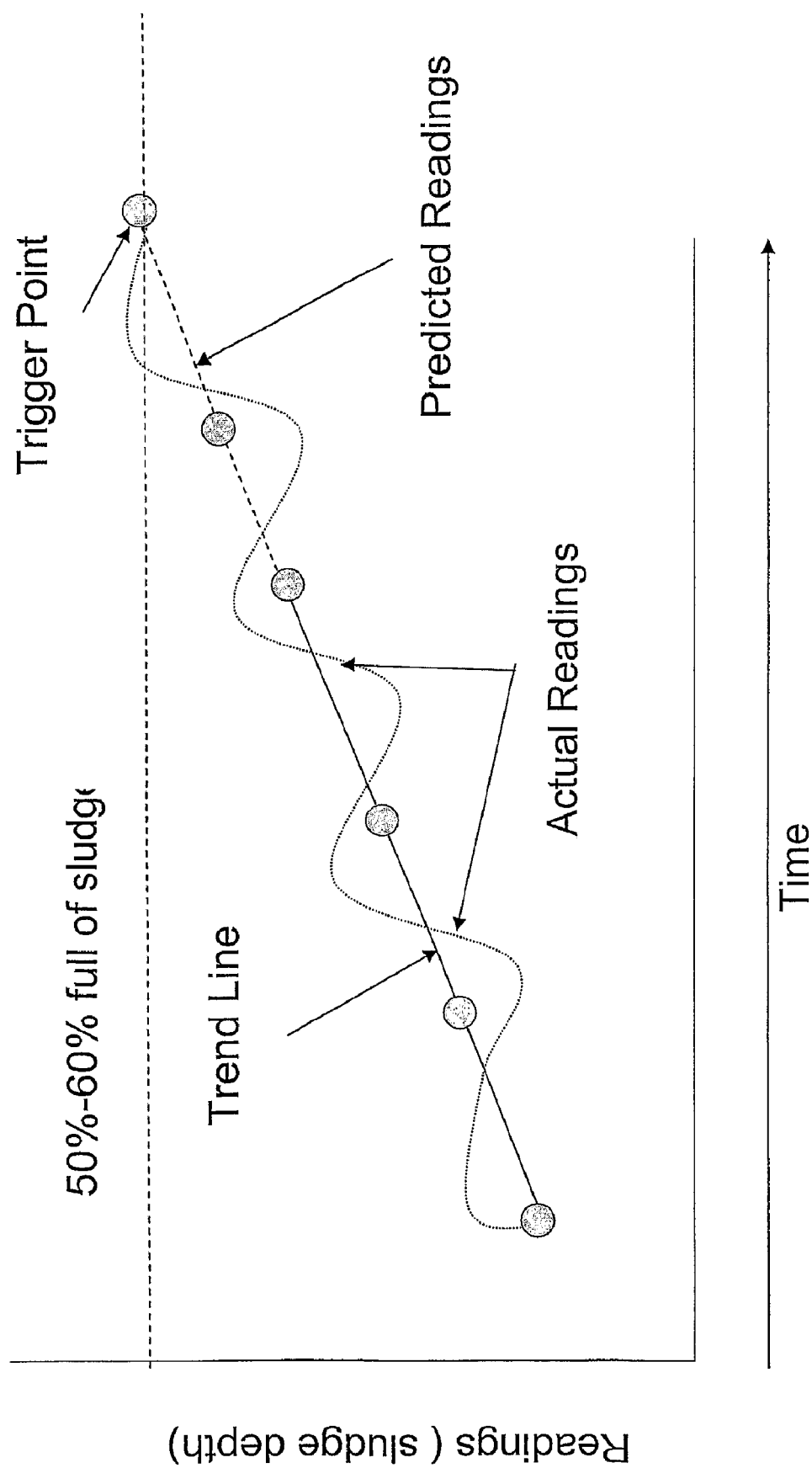
FIG. 3 shows a graph of pressure readings as sludge builds up over time.

The graph in FIG. 3 indicates a typical output from the pressure sensor registered by the monitor as readings of sludge depth over time. The actual readings can vary but they are then treated with a regression algorithm to create a line of best fit. This is then used to monitor trends and predict trigger points for service.

Typically a pressure rise of about 1% may be used as a trigger point for service, as this may be indicative of a depth of sludge which has reached the limit of acceptability. However, the actual trigger point may vary depending on the configuration of the septic tank. Another way of looking at the trigger point would be to equate it to a predetermined acceptable level of sludge. For instance in a septic tank with a dividing wall 22, it may be preferable to set the trigger point at a pressure level in the primary chamber which corresponds to a sludge depth at or below the level of the opening 26.

In another scenario, if the pressure sensor is placed in the secondary chamber, any consistent increase in pressure may be sufficient to trigger a warning.

In an alternative scenario, applicants have also found that after a period of time, following an initial rise in pressure in the primary chamber, there may also be a reduction in pressure. Whilst the reasons for this reduction in pressure are unclear, on the basis of experiments carried out so far, it would appear that the change from increase in pressure to a reduction of pressure of 1% may be taken as a trigger point or warning point whereby the monitor system generates a signal to indicate that the septic tank needs to be emptied.

Similarly, an additional pressure sensor may be placed at or below the scum layer. Again this may be set so that a pressure variation of about 1% triggers an indication that an inspection is required.

Whilst the above description includes the preferred embodiments of the invention, it is to be understood that many variations, alterations, modifications and/or additions may be introduced into the constructions and arrangements of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge in Australia.

The invention claimed is:

1. A method of determining whether a septic tank containing a water and sludge mixture needs to be emptied, comprising locating a pressure sensor in a region of the tank where sludge is likely to form; and generating a warning signal if the pressure of the mixture is measured by the sensor as being in excess of 1.01 times that of a comparable depth of water.

2. The method according to claim 1 wherein the pressure is measured proximate a bottom of the septic tank.

3. The method according to claim 2 wherein the mixture contains sludge and the warning signal is generated if the pressure of the mixture is measured by the sensor as being in excess of 1.02 times that of a comparable depth of water.

4. A method of determining whether a septic tank containing a water and sludge mixture needs to be emptied, comprising locating a pressure sensor in a region of the tank where sludge is likely to form; and generating a warning signal if the pressure measured by the sensor decreases by at least 1% over a period of time.

5. A method of determining whether a septic tank containing a scum layer formed on top of sewerage needs to be emptied comprising, locating a pressure sensor in an upper level of the tank to measure the pressure due to the scum layer and generating a warning signal if the pressure of the scum layer corresponds to a pressure at least 1% lower than an equivalent level of water.

* * * * *